W. W. CAMERON.
LUGGAGE CARRIER.
APPLICATION FILED SEPT. 25, 1917.
1,328,316.
Patented Jan. 20, 1920.
2 SHEETS—SHEET 1.
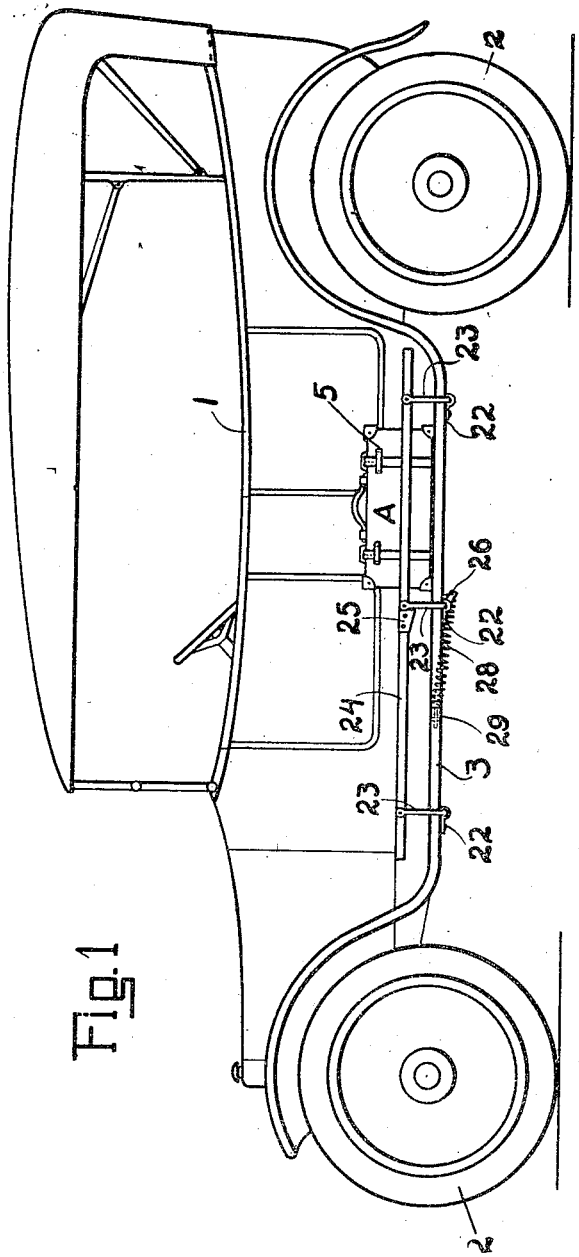
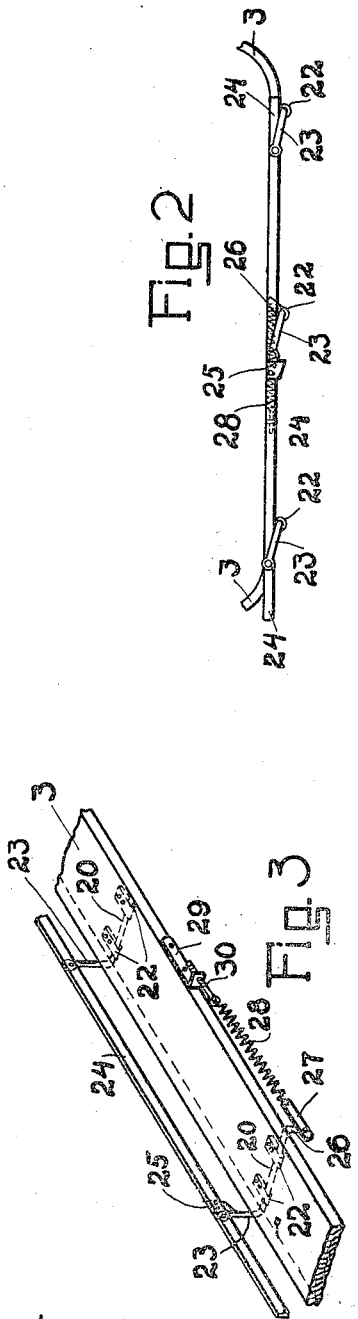
Inventor
William Wallace Cameron
by C.W. Dickinson Attorney

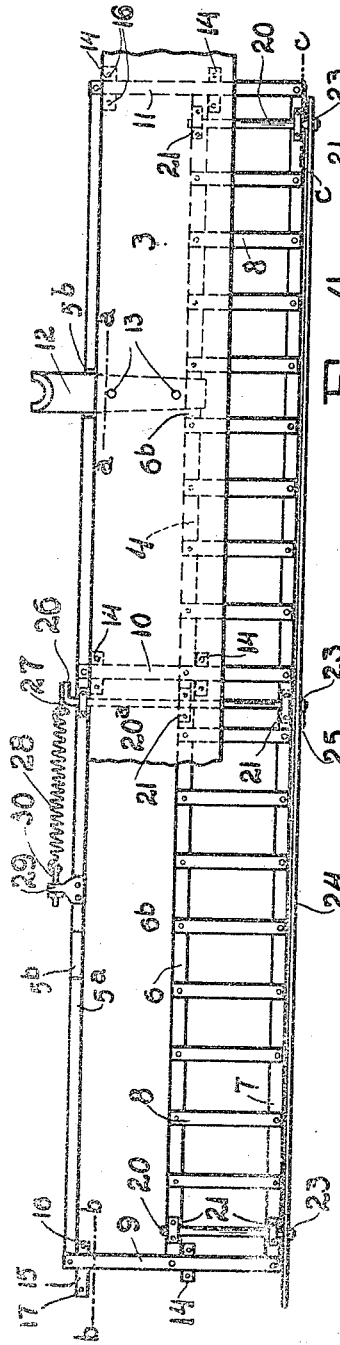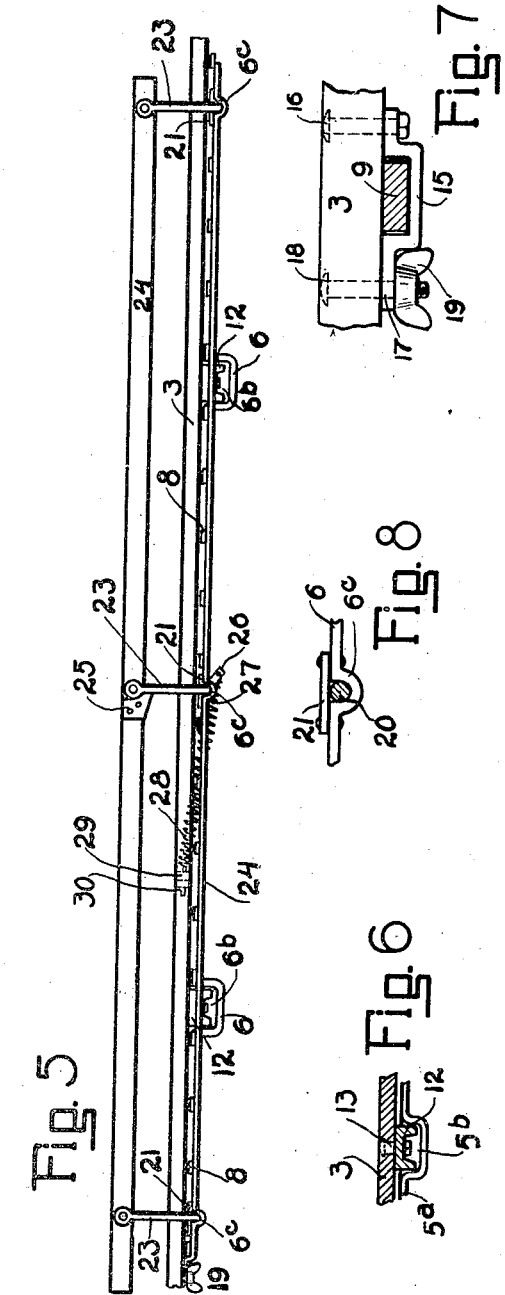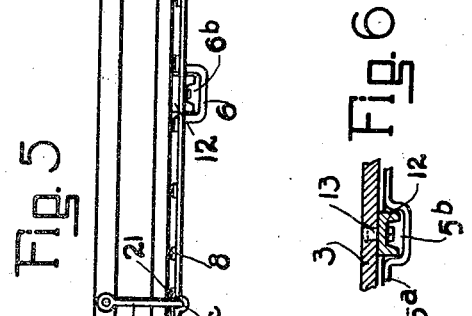

UNITED STATES PATENT OFFICE.

WILLIAM WALLACE CAMERON, OF LA CROSSE, WISCONSIN, ASSIGNOR OF ONE-HALF TO HARRY J. HIRSHHEIMER, OF LA CROSSE, WISCONSIN.

LUGGAGE-CARRIER.

1,328,316.   Specification of Letters Patent.   Patented Jan. 20, 1920.

Application filed September 25, 1917. Serial No. 193,074.

*To all whom it may concern:*

Be it known that I, WILLIAM WALLACE CAMERON, a citizen of the United States of America, residing in La Crosse, county of La Crosse, State of Wisconsin, have invented new and useful Improvements in Luggage-Carriers, of which the following is a true specification, reference being had to the accompanying drawings.

The invention has reference to collapsible luggage carriers.

An object of the invention is to furnish a device of the kind named that may be secured to platforms and other places where luggage is carried or stored, that when in use is held in position to prevent articles from falling sidewise from the platform or floor on which they are placed, and which, when not in use, may be quickly collapsed and held out of the way of free use of the platform sidewise, without removal from the platform, and the device may be applied to such platforms as the foot board of an automobile, the top of a coach, and the like.

Another object of the invention is to provide an adjustable section of platform or floor whereby the width of the floor space may be increased temporarily for luggage carrying purposes or reduced to normal proportions as may be desired, and that may be adjustably supported by the platform of normal width. The method of securing these objects is disclosed in the following portion of this specification.

In the drawings, Figure 1 is a side view of an ordinary automobile to which the invention has been applied, showing the posts and retaining bar on the same in elevated position for holding articles in position upon the foot board of the same; Fig. 2 is a detail of a portion of the foot board showing the device in collapsed position with the retaining bar lying alongside the outer edge of the foot board; Fig. 3 is a detail of the same parts in perspective, Figs. 1—2—3 showing a carrier attached directly to the foot-board or platform; Fig. 4 is a plan view of the foot board of an automobile with a portion broken away and an adjustable portion of a platform that may be moved in and out with respect thereto and to which the side retaining bar has been applied; Fig. 5 is a side elevation of the parts shown in Fig. 4; Fig. 6 is a detail showing the horizontal portion of a lug by means of which the foot board is secured to the chassis of an automobile, taken on the line $a$—$a$ of Fig. 4; Fig. 7 is a detail of the means by which the adjustable portion of the platform is held in adjusted positions with respect to the foot board, taken on the line $b$—$b$ of Fig. 4; Fig. 8 is a detail showing the means by which the shaft of the post carrying the retaining bar is secured to the adjustable platform, taken on the line $c$—$c$ of Fig. 4, Figs. 4, 5 and 8 showing the carrier attached directly to an adjustable platform, the latter being attached to the fixed platform.

1 is the body of an ordinary automobile, 2 the front and rear sustaining wheels, 3 the foot board, which is secured to the body by any approved means as by the lug 12; 4 is the frame of the adjustable portion of a platform having longitudinal bars $5^a$, 6 and 7, and transverse connecting bars 9, 10 and 11, securely riveted together. Between the outer bars 6 and 7 is placed a series of transverse straps 8, riveted thereto, to form the floor of the adjustable portion of the platform. The horizontal portion of the lug 12 is secured to the bottom of the foot board by the bolts 13, and provision is made for permitting transverse movement of the adjustable platform beneath the lug by the depressions $5^b$—$5^b$ and $6^b$—$6^b$ in the bars $5^a$ and 6, only one of the lugs 12 being shown in Fig. 4. As many depressions in the bars may be made as there are lugs for securing the foot board to the body.

14 are clips placed beneath the respective bars 9, 10 and 11 and secured to the under side of the foot board by the bolts 16, to permit of free transverse movement of the adjustable platform with respect to the foot board; see Fig. 7; one of the clips, as 17, may be made with one leg longer than the others to permit of the free use of the thumb-nut 19 on the bolt 18, for fastening the adjustable platform in adjusted positions.

20 are the horizontal shaft portions of the pivoted posts 23; 21 are clips that hold the shafts in the depressions $6^c$ of the bars 6 and 7; see Fig. 8. The central shaft $20^a$ on the adjustable platform is prolonged to reach beyond the bar $5^a$, which is provided with a similar depression—all of these depressions and their clips forming boxes for the transverse shafts. 24 is a longitudinal bar pivotally carried at the tops of the posts 23. A stop 25 is placed on the bar 24 adjacent the central post 23, so as to prevent movement beyond the vertical in one direction while permitting free movement in the opposite direction. On the inner end of the central shaft, 20ª, beyond the bar 5ª, a depending arm 26 is formed at an angle with the post 23, and to the free end of the arm 26 a spring 28 is connected by means of the strap 27, the opposite end of the spring being connected by the threaded rod and nut 30 to a clip 29 when the device is used without the adjustable platform, the clip being secured to the inner edge of the foot board; when used with the adjustable platform the spring is connected thereto by the clip 29ª on the bar 5ª.

The arrangement of the arm 26 with the spring 28 is such that when the posts 23 stand vertically the pull of the spring on the arm holds the posts upright and the bar 24 in position to keep articles from falling sidewise from the foot board; but when the bar 24 has been depressed to lie along the outer edge of the foot board, the pull of the spring has passed over the center line between the lug 29, the axis of the shaft 20ª and the free end of the arm 26 and is exerted to hold the parts in their collapsed position, and the platform is left free from obstruction by the bar 24.

When the device is used without the adjustable platform, instead of having depressions 6ᶜ and clips 21 to hold the shafts 20, I have used ears 22, which may be screwed or bolted to the under side of the foot board 3. The arrangement of the clips 14 is such that when the adjustable platform 4 is adjusted outwardly to the fullest extent permitted by the construction shown, the bar 5ª contacts the inner clips 14 on the foot board and the bar 6 contacts the outer clips 14, to prevent further movement in that direction; but when the platform 4 is in its innermost position bar 7 will contact the outer clips from the opposite side and prevent further movement inwardly. The thumb nut 19 will secure the platform in its innermost and outermost positions, and at any intermediate positions therebetween.

The construction of the device is such that the side retaining feature of the invention may be applied to existing automobiles by making the horizontal shafts of the proper lengths suitable to the widths of the foot boards; and the adjustable platform with the side retaining feature may also be applied to existing machines; and both features may be applied separately or together to newly building machines. The automatic locking of the side retaining feature of the invention by reason of the spring connection, makes it very simple to throw the device into and out of use, and the adjustable platform may with almost equal ease be drawn out and into adjusted positions and be quickly and securely fastened therein.

While I have shown the invention as applied to automobiles it is manifest that it may be applied to a large number of platforms or bottoms of carriers, both as to the adjustable platform and side retaining feature in conjunction or the side retaining feature may be applied separately; and it is also manifest that the construction of the device may be departed from widely and still be within the scope of the invention.

Having shown and described my invention, what I claim is:

1. In a collapsible luggage carrier, the combination of a longitudinal bar, supports for the bar comprising horizontal shafts having right angled arms thereon, pivoted connections between the bar and the supports, means for pivoting the shafts to a platform, said supports being adapted to swing the bar to a position above the level of the platform and downward to rest upon the shafts, a stop on the bar adapted to contact an arm to limit the movement thereof with respect to the arms when in its upper position, and means connected with one of the shafts for holding the carrier in its alternative position.

2. In a collapsible luggage carrier, the combination of a longitudinal bar, supports for the bar comprising horizontal shafts having right angled arms thereon, pivotal connections between the bar and the arms, means for pivoting the shafts to a platform, said supports being adapted to swing the bar to alternative raised and lowered positions, a stop on the bar adapted to contact an arm to limit the movement of the bar with respect to the arms when in raised position, and means connected with one of the shafts to hold the arm against the stop.

3. In a collapsible luggage carrier, the combination of a longitudinal bar, pivoted collapsible supports for the bar, one of the supports comprising a horizontal shaft having a right angled arm at one end thereof, a lever at the opposite end in angular relation to the arm, means for pivotally securing the shaft to a platform, a pivotal connection between the bar and the outer extremity of the arm, said lever being adapted to rotate the shaft to shift the bar to raised and lowered positions, means for operating the lever during a portion of its movement, and a stop on the bar adapted to contact a support to limit its movement when in raised position.

4. In a collapsible luggage carrier, the combination of a longitudinal bar, pivoted collapsible supports for the bar, one of the supports comprising a horizontal shaft having an arm at one end at right angles thereto, a lever at the opposite end in angular relation to its arm, means for pivotally securing the shaft to a platform, a pivotal connection between the bar and the outer extremity of the arm, the supports being adapted to shift the bar to raised and lowered positions, a stop on the bar adapted to contact a support to limit the movement of the bar when raised, the shaft being adapted to stop the downward movement of the bar when in line with the edge of the platform, and means for operating the lever during a portion of its movement.

WILLIAM WALLACE CAMERON.